J. H. PEARSON.
CEMENT BLOCK MACHINE.
APPLICATION FILED NOV. 22, 1920.

1,398,442.

Patented Nov. 29, 1921.
9 SHEETS—SHEET 2.

J. H. PEARSON.
CEMENT BLOCK MACHINE.
APPLICATION FILED NOV 22, 1920.

1,398,442.

Patented Nov. 29, 1921.
9 SHEETS—SHEET 3.

J. H. Pearson
Inventor

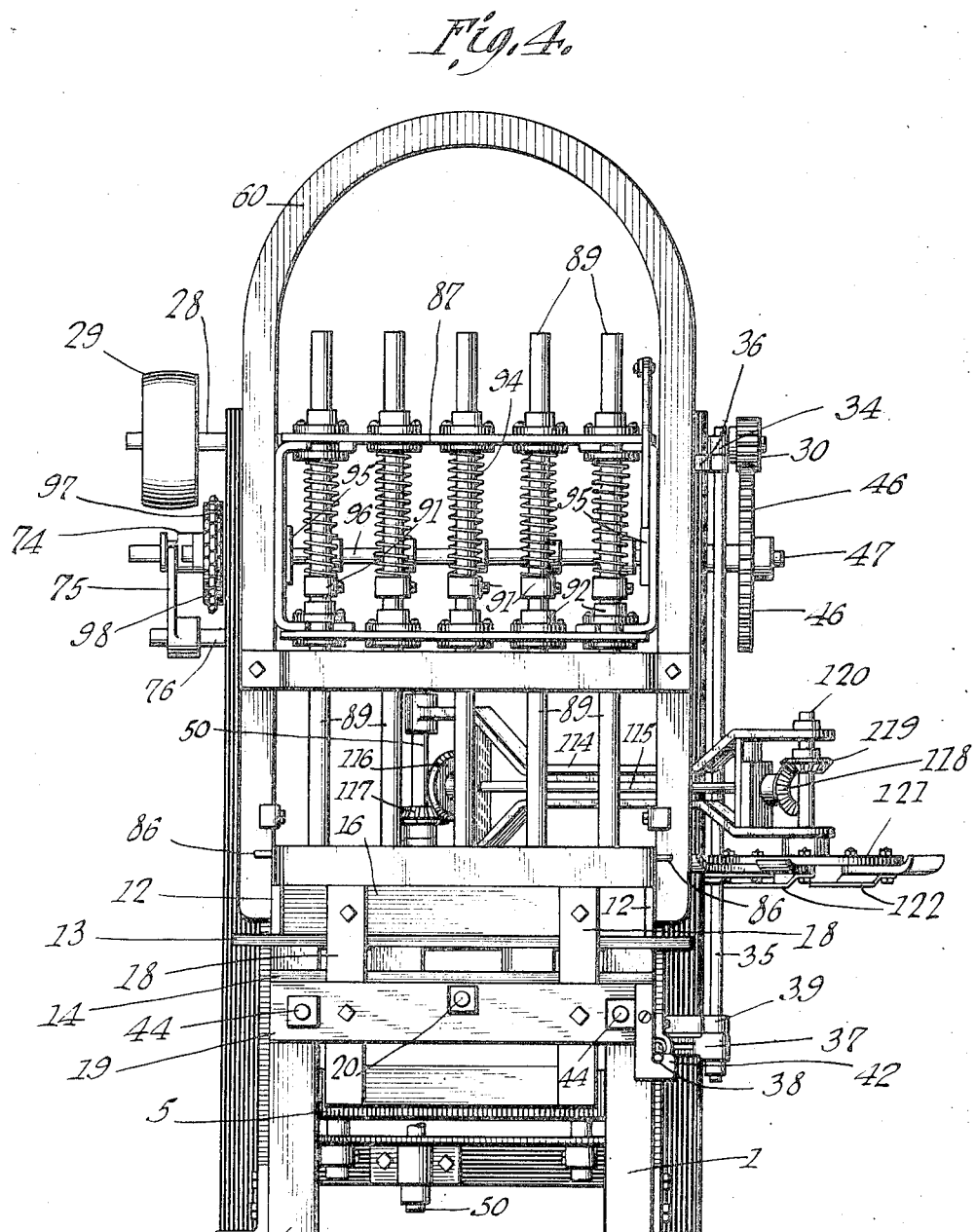

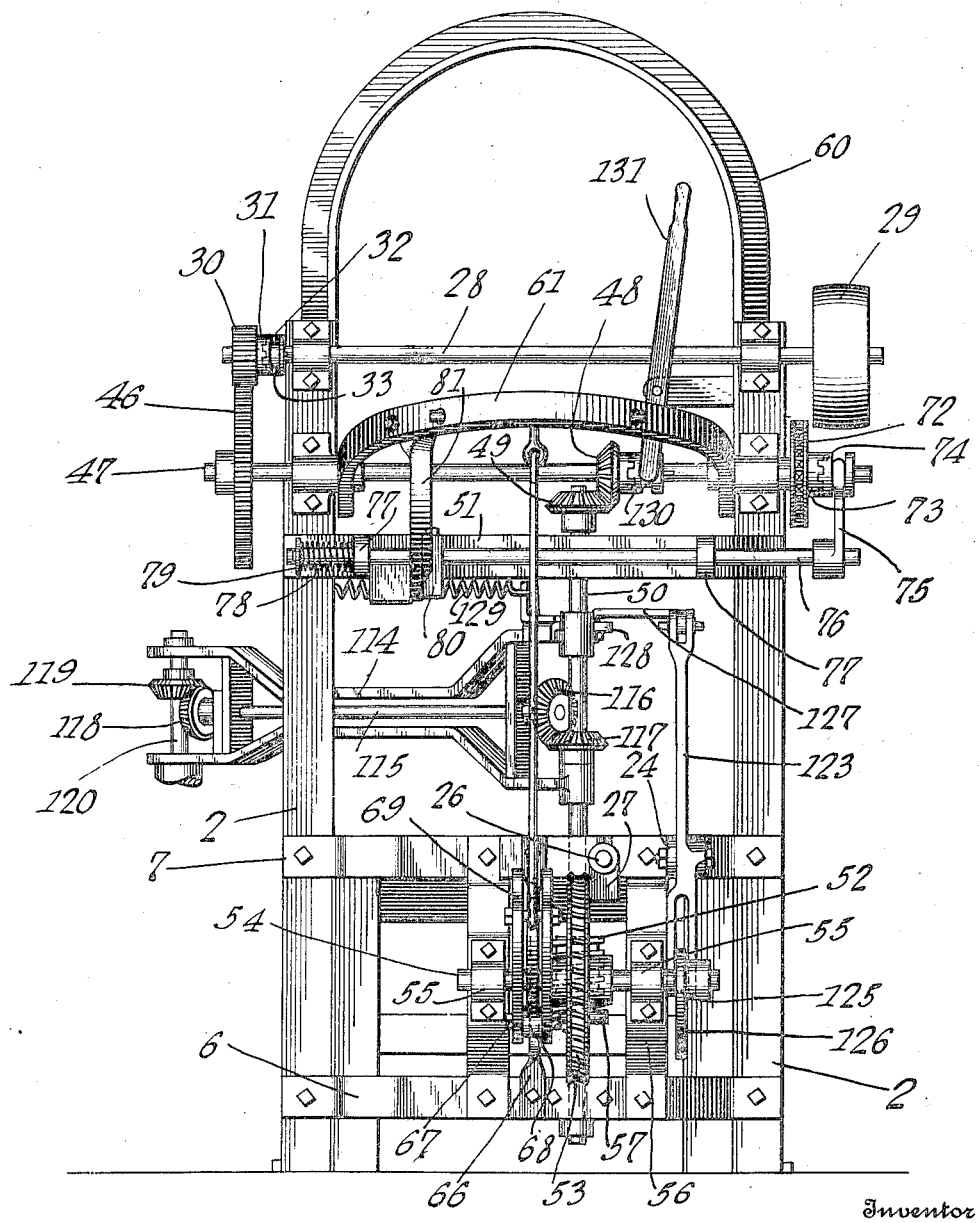

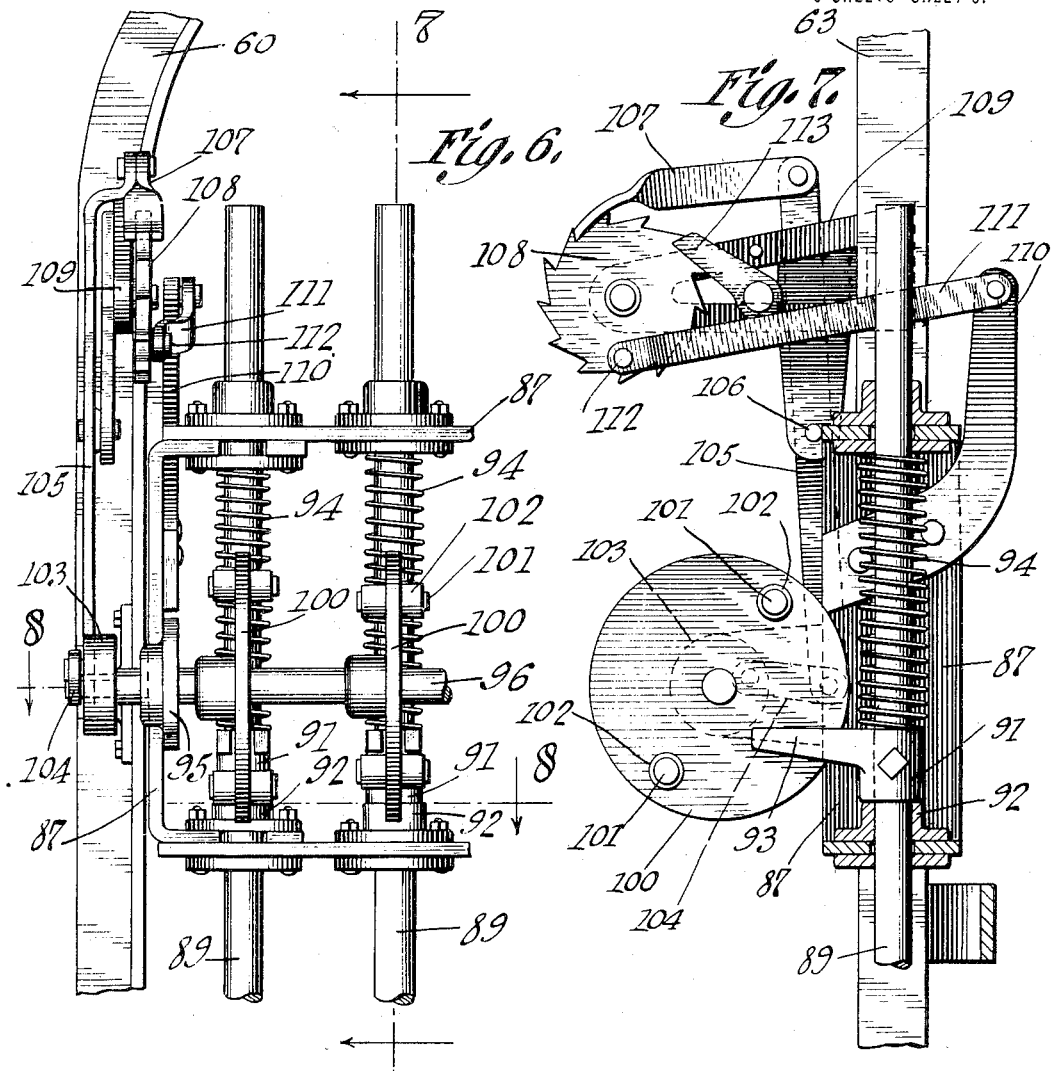
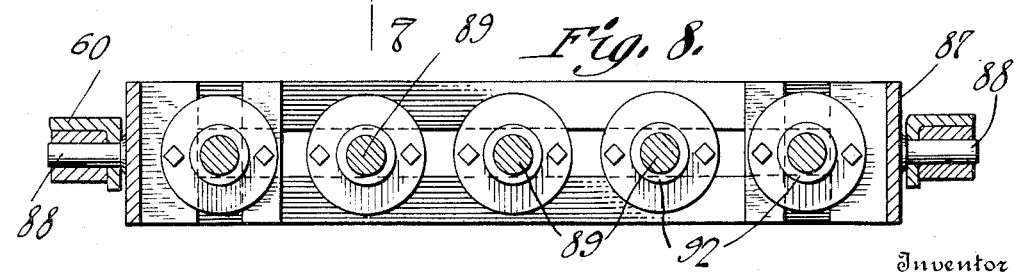

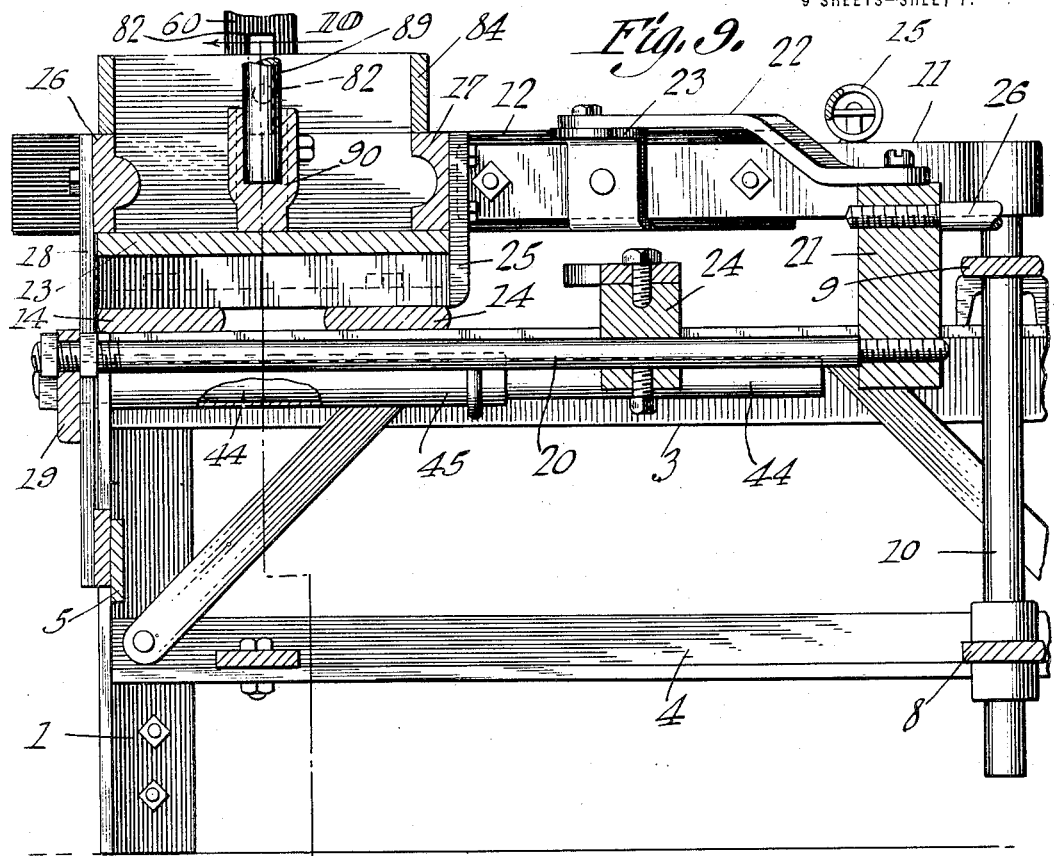
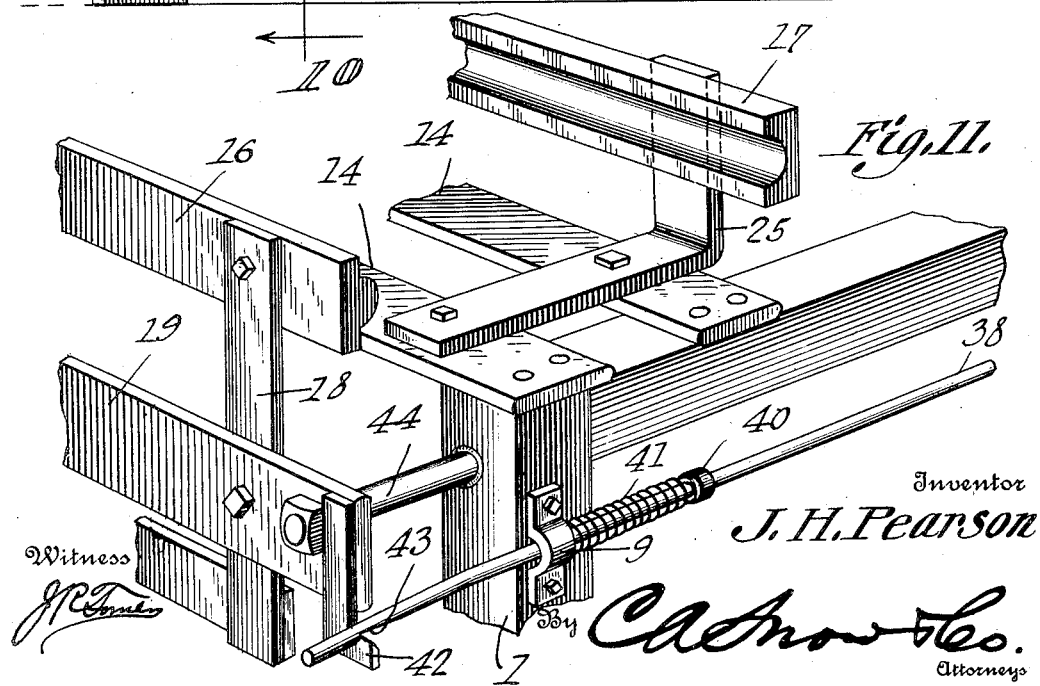

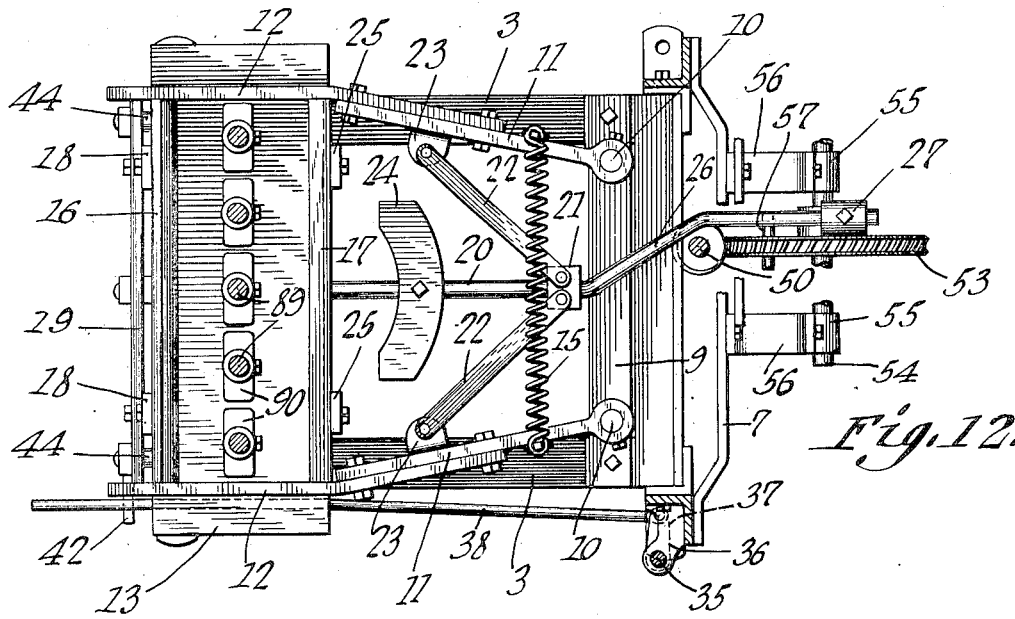
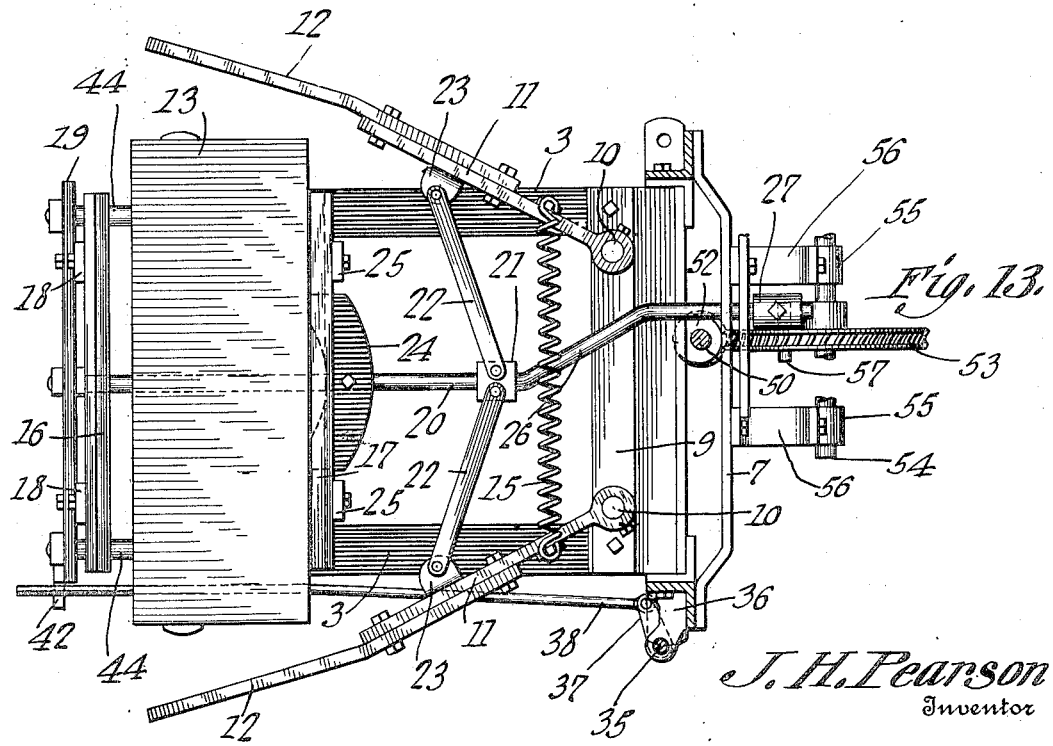

UNITED STATES PATENT OFFICE.

JAMES H. PEARSON, OF BLOOMFIELD, INDIANA, ASSIGNOR TO CONCRETE SILO COMPANY, OF BLOOMFIELD, INDIANA.

CEMENT-BLOCK MACHINE.

1,398,442. Specification of Letters Patent. Patented Nov. 29, 1921.

Application filed November 22, 1920. Serial No. 425,806.

*To all whom it may concern:*

Be it known that I, JAMES H. PEARSON, a citizen of the United States, residing at Bloomfield, in the county of Greene and State of Indiana, have invented a new and useful Cement-Block Machine, of which the following is a specification.

This invention relates to machines for making cement blocks, one of the objects of the invention being to provide a power driven machine which operates successively to tamp the material in the form, lift the tamping elements out of operative positions, smooth off the top surface of the molded objects, open the mold, deliver the pallet, and subsequently reset the parts to allow repetition of the foregoing operations.

A still further object is to provide a series of tamping elements designed to pack all portions of the material within the mold, these elements operating in succession and working across the material from one side to the other of the mold.

A still further object is to provide a rotary troweling or smoothing device having means for bringing it into and out of operative position automatically after the tamping of the material in the mold.

A still further object its to provide means operated by the opening of the mold for uncoupling the machine from its driving mechanism pending the recoupling of the parts by the operator.

Another object is to provide a machine of this character which is simple and compact in construction and all of the parts of which are easily accessible.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown. In said drawings—

Fig. 4 is a front elevation of the machine, the parts being located as shown in Fig. 1.

Fig. 5 is a rear elevation of the machine.

Fig. 6 is a rear elevation of one side portion of the tamping mechanism.

Fig. 7 is a section on line 7—7, Fig. 6.

Fig. 8 is a section on line 8—8, Fig. 6.

Fig. 9 is a central vertical longitudinal section through the lower portion of the front of the machine and showing a mold, one of the tamping elements, and a portion of the mold opening and pallet delivering mechanism.

Fig. 11 is a perspective view of a portion of the opened mold and showing the clutch operating rod shifted thereby.

Fig. 12 is a plan view of the mold and coöperating parts, the said mold being in closed position and the tamping elements in section.

Fig. 13 is a similar view showing the mold open and the pallet in forwardly shifted position.

Figure 1:
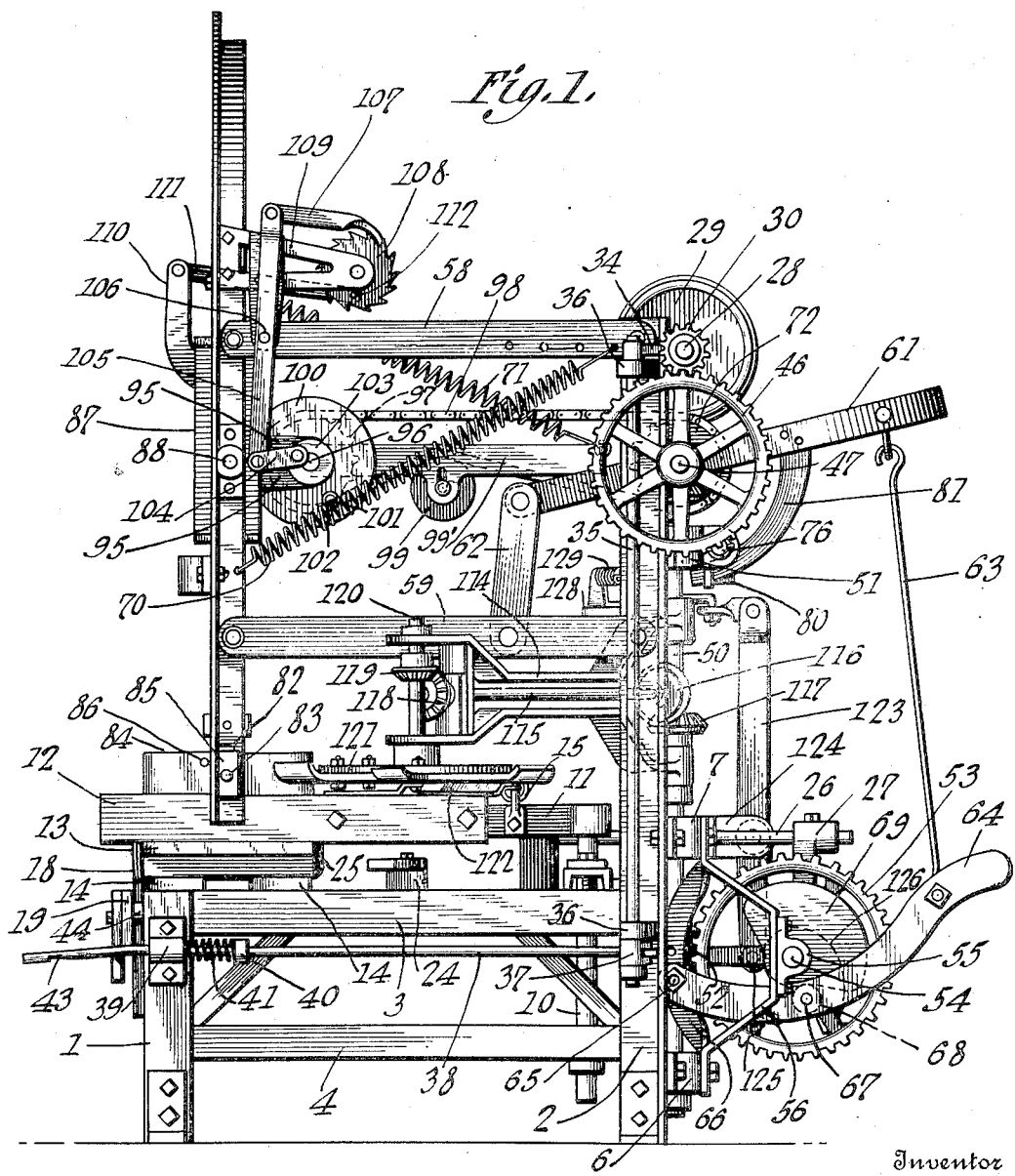
Figure 1 is a side elevation of the complete machine and showing the tamping head in its lower position.

Referring to the figures by characters of reference 1 designates the front legs or standards of the machine and 2 designates rear standards which project considerable distance above the standards 1 and are connected to the upper end of the standards 1 by horizontal side beams 3 and by lower side strips 4. The standards or legs 1 are also connected together by a cross strip 5 and the lower portions of the standards 2 are connected by suitable cross bars 6 and 7 arranged one above the other. Braces may be provided wherever desired to strengthen the frame and connecting the rear portions of the side strips 4 is a cross strip 8 while another cross strip 9 is arranged directly thereabove and connects the rear portions of the side beams 3.

Journaled within the strips 8 and 9 adjacent the sides of the frame are parallel vertical stems 10 to the upper ends of which are secured arms 11 extending forwardly and terminating in end strips 12 adapted to extend over the ends of a removable pallet 13 supported on cross strips 14 secured to the front portions of the side beams 3. These arms 11 are connected by a coiled spring 15 so that they are normally drawn together and against the ends of the front and back walls 16 and 17 respectively of the mold. These walls are adapted to rest on the pallet, the front wall being provided with downwardly extending strips 18 connected by a cross strip 19 thus to form a head. To the center of this head is attached the front end of a rod 20 which extends longitudinally along the center of the frame of the machine and is provided at its rear end with a block 21 on which are mounted toggle links 22. These links diverge forwardly and are pivotally connected to brackets 23 on the arms 11. A cross head 24 is secured to the rod 20 and is adapted to move forwardly against the pallet 13 when the front wall 16 is shifted fowardly, thus to slide the pallet 13 away from the rear wall 17 which is stationary and is connected to the cross strips 14 in any manner desired, as by means of brackets 25. An arm 26 is extended rearwardly from the upper portion of the block 21, the same being offset laterally as shown and provided, at its rear end, with an adjustable head 27 for the purpose hereinafter pointed out.

Journaled upon the upper end portions of the standards 2 is a drive shaft 28 to one end of which is secured a pulley 29 adapted to be continuously operated by a belt not shown. Loosely mounted on the other end portion of the shaft 28 is a gear 30 having a clutch face 31 adapted to be engaged by a clutch 32 which is feathered on the shaft 28 and is engaged by the forked end 33 of a throwing arm 34. This arm is secured to the upper end of a shaft 35 journaled in suitable brackets 36 provided on one of the standards 2. An arm 37 extends from the lower portion of the shaft 35 and has a rod 38 pivotally connected thereto. This rod extends along one side of the machine and is slidable within a guide bracket 39, there being a collar 40 on the rod. A spring 41 is mounted on the rod 38 between the collar 40 and the guide bracket 39 and serves to hold the shaft 35 normally positioned to press the clutch member 32 into engagement with the clutch face 31 of gear 30 thus to maintain normally an operative connection between the pulley 29 and the gear 30. The rod 38 extends over a finger 42 which extends laterally from the strip 19 of the movable head of the mold, this finger being preferably provided with a knife edge as shown in Fig. 11. A notch 43 is formed in the bottom portion of the rod 38 and the finger 42 and notch 43 are so positioned relative to each other that when the front wall 16 of the mold reaches the limit of its outward movement during the opening of the mold, the finger 42 will enter the notch 43 and pull the rod 38 longitudinally, thereby shifting the clutch member 32 and uncoupling the gear 30 from the pulley 29 and its shaft 28. Accordingly when the mold is fully opened the various parts of the mechanism of the machine will cease operating until the operator, after removing the pallet and placing a new one in the machine, pulls upwardly on the end of the rod 38 so as to disengage it from the finger 42 and allow the spring 41 to throw the clutch member 32 back into active or engaging position.

By referring particularly to Fig. 11 it will be noted that the ends of the cross strip 19 forming a part of the head which carries the front wall 16, are provided with parallel rods 44 which work within guide tubes 45 secured to the inner sides of the side beams 3 and opening through the front faces of the legs or standards 1. Thus the wall 16 is accurately guided during its right line movement hereinbefore described.

The gear 30 meshes at all times with a large gear 46 secured to one end of a transverse shaft 47 journaled upon the upper portions of the standards 2 and secured to this shaft is a gear 48 meshing with a gear 49 secured to the upper end portion of a vertical shaft 50. The upper portion of this shaft is journaled in a cross beam 51 which is fixedly connected to the standards 2 while the lower portion of the shaft 50 is journaled on the lower cross beam 6. Secured to this shaft between the beams 6 and 7 is a worm 52 constantly meshing with a large worm gear 53 secured to a transverse shaft 54. This shaft is journaled in bearings 55 carried by strips 56 which connect the upper and lower beams 7 and 6. The head 27 hereinbefore referred to laps one side of the worm gear 53 and extending laterally from this side of the worm gear is a pin or tappet 57 adapted, once during each rotation of the worm gear, to come against the head 27, shift it longitudinally in one direction and cause the toggle links 22 to move the end strips apart against the action of the spring 15, thrust the front wall 16 forwardly by means of the rod 20, and then push the pallet 13 with the molded object thereon away from the mold wall 17. The parts are so timed that the rod 38 is shifted by the finger 42 just prior to the movement of the pin 37 out of engagement with the head 27. Consequently the rotation of the gear 53 is stopped before the head 27 can be released and the parts of the mold are left open with the spring 15 under tension until, when the operator lifts the rod 38 out of engagement with the finger 42, the mechanism can be recoupled to the drive shaft 28 and the operation of the mechanism continued. Soon after the gear 53 again starts to rotate, the pin 57 will pass out of engagement with the head 27 and the spring 15 will promptly snap the various parts of the mold, the rod 20, and the head 27 back to their initial positions. It is to be understood of course that the rod 38 is not to be released by the operator until after the pallet containing the molded object has been removed and another pallet has been placed on the supporting strips 14.

Figure 2:
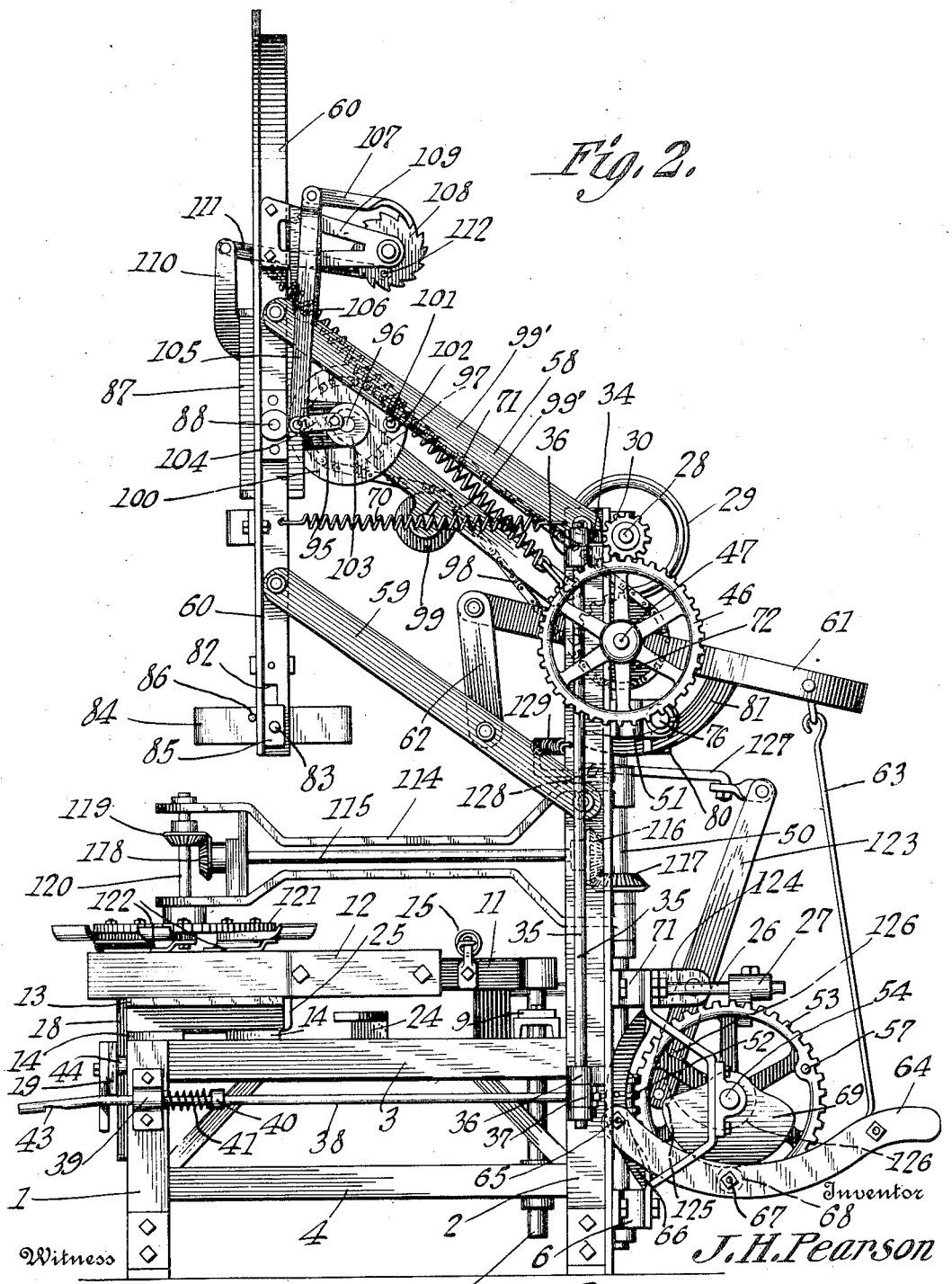
Fig. 2 is a similar view showing the tamping head raised and the smoothing element in position therebelow.
Figure 3:
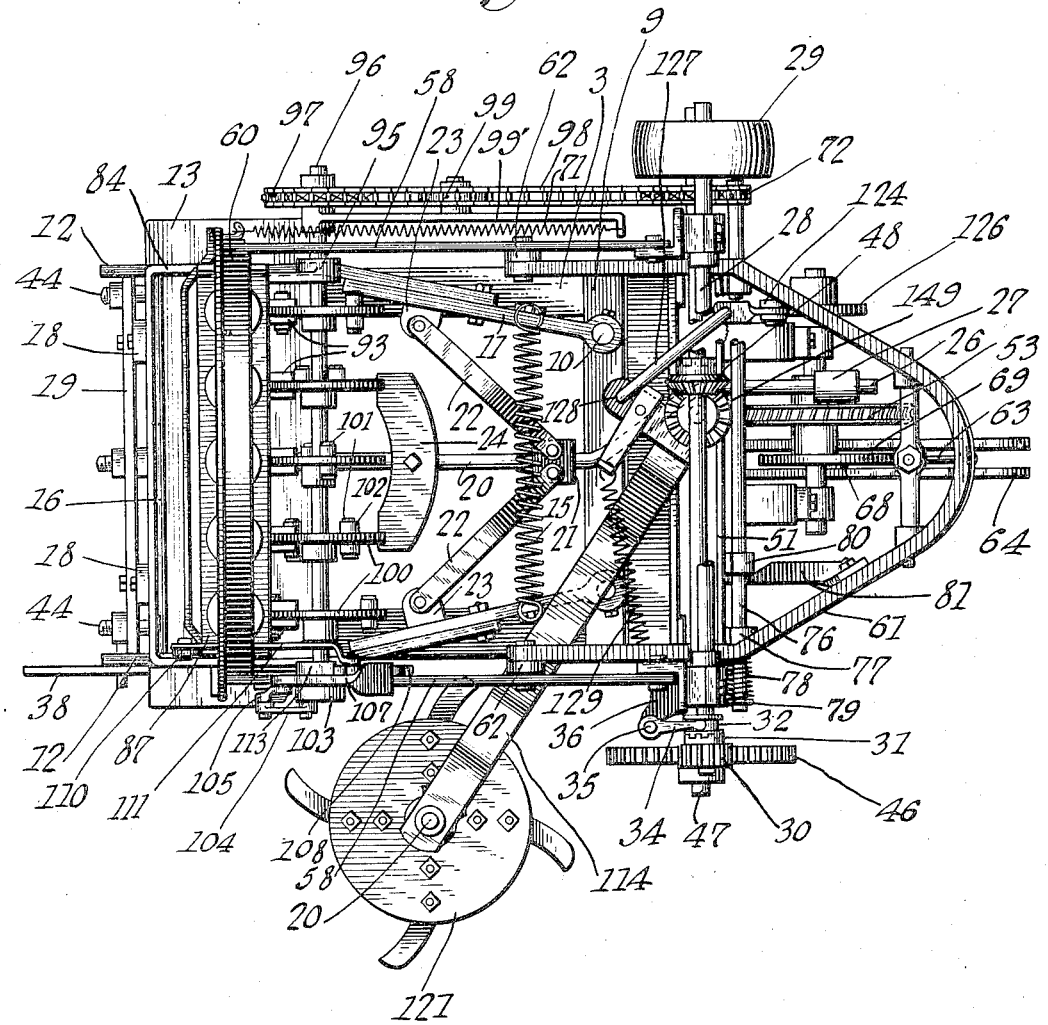
Fig. 3 is a plan view of the machine with the parts positioned as in Fig. 1.
Figure 10:
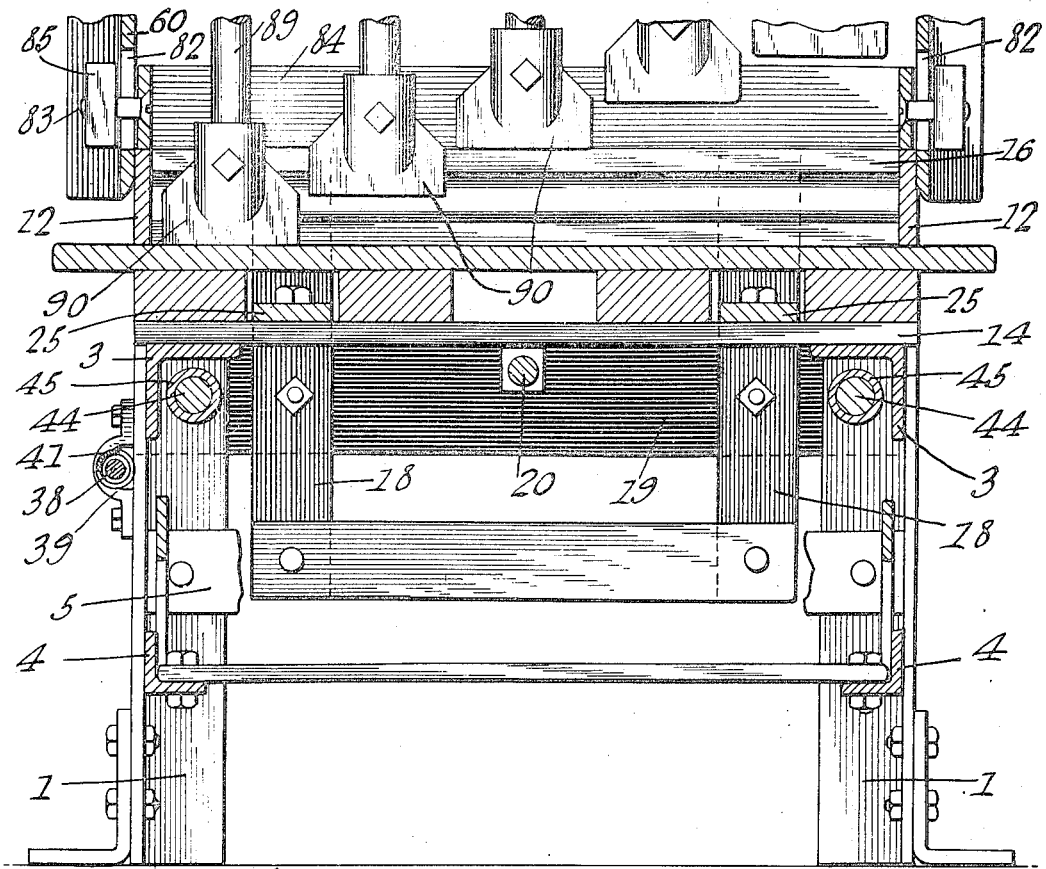
Fig. 10 is a section on line 10—10, Fig. 9, the tamping elements being in elevation.
Figure 14:
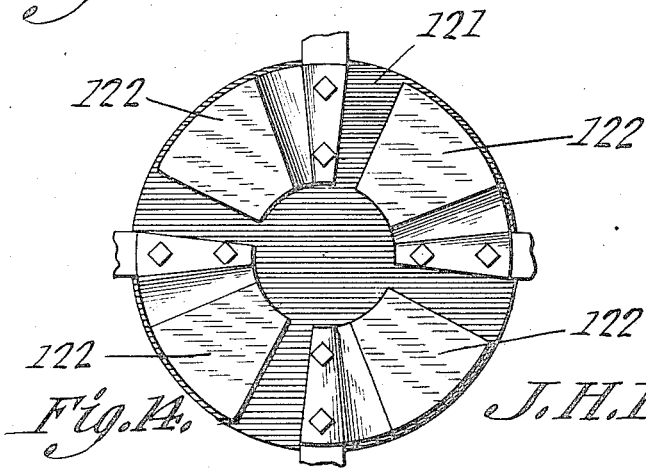
Fig. 14 is a bottom plan view of the smoothing member.

Pivotally connected to the upper portion of each of the standards 2 are upper and lower side strips 58 and 59 the forward ends of which are pivotally attached to the sides of a yoke 60. This yoke, with the strips 58 and 59 and the standards 2 thus form parallelograms so that when the yoke is moved upwardly or downwardly it will be maintained vertical. An operating yoke 61 is pivotally mounted on the shaft 47 and extends between the standards 2, the forward ends of the yoke being connected to the side strips 59 by links 62. The rear end of the yoke has a connecting rod 63 attached to it and the lower end of this rod is connected to the free end of a lever 64 fulcrumed, as at 65, on a strip 66 which is secured to the cross beams 6 and 7. As shown particularly in Figs. 3 and 5 this lever 64 is formed of spaced strips suitably connected, there being a cross pin 67 extending between the strips and carrying an anti-friction roller 68. A cam 69 is secured to the shaft 54 and is designed to work between the strips forming the lever 64 and to engage the roller 68 during a portion of each rotation of the shaft 54 so as thus to thrust the lever 64 downwardly to pull through rod 63 on the yoke 61 and elevate the yoke 60 as shown in Fig. 2. This lifting action is facilitated by coiled springs 70 attached to the sides of the yoke 60 and to the back end portions of the strips 58. It will be noted that when the cam 69 passes out of engagement with the roller 68 the yoke 60 will drop while during the completion of this downward movement such movement will be retarded by the springs 70 being placed under tension. Thus excessive pounding of the mechanism during the lowering of the yoke 60 is prevented.

A sprocket 72 is loosely mounted on the shaft 47 and has a clutch face 73 adapted to be engaged by a clutch 74 which is feathered on the shaft 47 so as to rotate therewith. This clutch is engaged by an arm 75 extending from a rod 76 which is slidably mounted in guides 77 extending from the cross beam 51. A spring 78 is mounted on one end portion of the rod and bears against one of the guides 77 and a washer 79 or the like secured to the rod so as thus to hold the rod normally pressed in one direction with the clutch 74 engaging the clutch face 73 and the sprocket 72 coupled to the shaft 47. A block 80 is secured to the rod 76 and bears against one side of a tongue 81 which is secured to the yoke 51 and has a cam face for engaging the block 80. Thus it will be seen that when the yoke 61 is pulled downwardly in the manner hereinbefore pointed out, for the purpose of raising the yoke 60, the tongue 81 will shift the block 80 and the rod 76 against the action of the spring 78 and disengage the clutch 74 so as to uncouple the sprocket 72 from shaft 47.

Longitudinal slots 82 are formed in the lower end portions of the sides of the yoke 60 and receive pivot bolts 83 extending from the ends of a frame 84, these bolts being extended from blocks 85 engaging the outer sides of the yoke. Thus it will be seen that the frame 84 is capable of a sliding and tilting movement relative to the yoke 60. The frame is preferably slightly overbalanced and a stop pin 86 is extended from one end of the frame 84 and is adapted to engage the yoke to keep the said frame from tilting excessively.

Arranged within the yoke 60 near the center thereof is a guide frame 87 mounted to swing about pivot studs 88 provided therefor and which studs preferably are journaled in the sides of the yoke. In this frame 87 are slidably mounted parallel rods 89 each of which has a tamping foot 90 at its lower end, said tamping feet being adapted to work close together upon the material contained within the mold. Each of the rods 89 has a collar 91 secured thereto and adapted normally to bear against a guide boss 92 upon the bottom of the frame 87. A finger 93 is extended from each collar while mounted on each rod 89 is a spring 94 which bears downwardly against the collar 91 and upwardly against the top of the frame 87. Obviously, therefore, the tamping feet are held normally in their lowermost positions.

Brackets 95 are extended rearwardly from the ends of the frame 87 and journaled within them is a transverse shaft 96 to one end of which is connected a sprocket 97. This sprocket receives motion through a chain 98 from the sprocket 72 hereinbefore referred to. The chain 98 can be provided with a suitable tightener in the form of an idler wheel 99 carried by a pivoted arm 99' controlled by a spring 71.

Secured to the shaft 96 is a series of disks 100 each of which is provided with tappet pins 101 extending laterally therefrom and which can be provided with wear sleeves or rollers 102. These pins are so positioned that, during the rotation of the shaft 96, the pins will come under the fingers 93 and lift them, the rods 89 and their tamping feet 90 being raised successively and then released.

That end of the shaft 96 remote from the sprocket 97 has a crank arm or disk 103 adapted to transmit motion through a link 104 to a lever 105 which is fulcrumed, as at 106 on one side of the yoke 60. The upper end of this lever carries a pawl 107 engaging a ratchet wheel 108 journaled on a bracket 109 extending from the yoke 60. An arm 110 extends upwardly from the pivoted frame 87 and has a link 111 extending therefrom and engaging a wrist pin 112 upon one side of the ratchet wheel 108. A dog 113 is pivoted on the bracket 109 and engages the ratchet wheels so as to prevent retrograde movement.

It will be understood that when the yoke 60 is in its lowermost position the frame 84 will rest on the walls of the mold which are closed together and as the sprocket 72 is coupled to the driving mechanism when the parts are thus positioned it will be obvious that motion will be transmitted to the shaft 96 and the tappets caused to successively elevate and release the tamping feet. During this actuation of the tamping devices the oscillation of lever 105 due to the rotation of the shaft 96 will result in the gradual rotation of the ratchet wheel 108 and the gradual thrusting through the link 111 against the arm 110. Thus the frame 87 will be swung from one extreme inclined position with the tamping elements close to the front wall 16 of the mold, to the other extreme inclined position with the tamping feet close to the wall 17. Just as the ratchet wheel 108 completes a one-half revolution sufficient to move the frame 87 as described the point of connection between the link 111 and the ratchet wheel 108 will pass above the dead center with the result that the weight of the parts will cause the frame 87 and the tamping feet to swing back to their initial positions, the link 111 at the same time thrusting against the ratchet wheel 108 so as to impart a one-half rotation thereto. After the tamping feet are thus reset they will continue to operate on the material in the mold, at the same time advancing toward the rear wall 17 after which they will again jump back to their initial positions in the manner described. This operation will take place any desired number of times according to the predetermined arrangement of the parts and until the cam 69 which has been rotating with the gear 53 comes against the roller 68 and simultaneously elevates the yoke 60 and shifts the clutch 74. As soon as this clutch is shifted the operation of the disks 100 and the tamping feet will promptly stop until the yoke 60 is again lowered and the parts thrown into operative position.

Mounted to swing horizontally on the shaft 50 is an arm 114 in which is journaled a longitudinal shaft 115. This shaft is provided at one end with a gear 116 constantly meshing with a gear 117 secured to the shaft 50. The outer end of the shaft 115 has a gear 118 meshing with a gear 119 on a short vertical shaft 120 journaled in the free end portion of the arm 114. To the lower end of this shaft 120 is secured a disk 121 and arranged upon the lower face of the disk are smoothing blades 122 which are inclined downwardly and rearwardly oppositely to the direction of rotation of the disk, the lower faces of these blades or wings being disposed in the same plane, and said plane being substantially flush with the upper edges of the walls of the mold.

A lever 123 is journaled on a bracket 124 extending from the beam 7 and the lower end of this lever carries an anti-friction roller 125 adapted to be engaged by a cam 126 which is connected to and rotates with the shaft 54. The upper end of the lever 123 has a link 127 connected thereto and to a laterally extending bracket 128 upon the rear portion of the arm 114. The parts are so disposed and timed that just after the elevation of the yoke 60 and prior to the actuation of the head 27, the cam 126 will press against the roller 125 and shift the lever 123 so as to pull through the link 127 upon the bracket 128 and cause the arm 114 to swing under the yoke 60 and over the mold. As the shafts 115 and 120 are rotating during the operation of the other parts of the mechanism and until the mold is opened, the revolving smoothing disk when moved transversely of the machine will cause its blades 122 to engage the top surface of the molded object and smooth it. As soon as the disk has passed across the machine the cam 126 will become disengaged from the roller 125 and a spring 129 which connects the arm 114 to one of the standards 2 will promptly return the disk 121 to its initial position beyond one side of the machine. Immediately after this operation the head 27 is shifted by the pin 57, the mold is opened, and the rod 38 is shifted to uncouple the drive shaft 28 from the mechanism. As soon as the operator places a pallet on the machine and disengages rod 38 from finger 42 the mechanism is coupled to the shaft 28 and thereafter operates to successively close the mold, lower the yoke 60, operate the tamping devices, raise the yoke, swing the smoothing device back and forth across the machine, and finally open the mold to deliver the pallet and the molded object thereon.

A clutch 130 operated by a lever 131 can be used for controlling the transmission of motion from shaft 47 to shaft 50.

While this machine has been described as a cement block machine, it is to be understood that it can be used for making any cement products, such as bricks, staves, and the like.

What is claimed is:—

1. In a cement block machine the combination with a mold having a removable pallet and separable walls, of a drive shaft and means operated thereby for successively moving the walls apart and shifting the pallet relative to the walls, and means operated by the movement of the walls for automatically uncoupling the shaft from the means driven thereby.

2. In a cement block machine the combination with a mold having a removable pallet and separable walls, of a drive shaft and means operated thereby for successively moving the walls apart and shifting the pallet relative to the walls, said means being shiftable by the operator to disengage the same from the movable walls, means for automatically coupling the shaft to the means operated thereby immediately after such release, and means for automatically closing together the walls of the mold subsequent to the coupling of the shaft.

3. In a cement block machine the combination with a mold and a drive shaft, of separate means operated by said shaft for tamping the contents of the mold, subsequently elevating the tamping means, then smoothing the top surface of the contents of the mold and finally opening the mold and delivering the molded object therefrom.

4. In a cement block machine the combination with a mold, of a series of tamping elements supported above the mold, means for successively actuating the tamping elements, means for swinging the series of elements progressively across the mold during the tamping action, and means for automatically returning said elements to their initial position above the mold upon the completion of each movement of the elements across the mold.

5. In a cement block machine the combination with a mold, of a series of tamping elements, means for moving said elements from one side of the mold to the opposite side, and means for reciprocating the tamping elements successively during such movement.

6. In a cement block machine the combination with a mold, of a series of tamping elements, means for swinging said elements across the mold with a step by step movement in one direction and with a continuous movement in the opposite direction, and means for successively reciprocating the tamping elements during said step by step movement.

7. In a cement block machine the combination with a mold of a tiltable frame movably supported adjacent thereto, a series of tamping elements mounted for reciprocation in said frame, revoluble means for successively actuating the tamping elements, a lever operated thereby, means operated by the lever for imparting a step by step swinging movement to the frame in one direction, said means being released when the frame reaches one limit of its movement, said frame when released being shiftable automatically to its other extreme or limit of movement.

8. In a cement block machine the combination with a tiltable frame and a mold adjacent thereto, of tamping elements mounted for reciprocation in the frame, revoluble means for successively actuating the tamping elements, a ratchet wheel, a link connection between said wheel and the frame, means operated by the rotation of the actuating means of the tamping elements for imparting a step by step movement to the ratchet wheel and correspondingly shift the frame in one direction, said link being movable past the dead center on the completion of such movement, the frame when reaching said limit of movement being shiftable automatically to its other limit of movement.

9. A cement block machine including a mold, a parallelogram shiftable relative thereto and including an upstanding movable structure, tamping elements mounted for reciprocation relative to said structure, revoluble means for successively elevating and releasing said elements, a drive shaft, means operated by the drive shaft for actuating said revoluble means, means operated by the drive shaft for swinging the parallelogram to elevate the tamping elements, and means operated by the elevation of the parallelogram for uncoupling the drive shaft from said revoluble means.

10. In a cement block machine the combination with a mold, of a structure movable upwardly and downwardly relative thereto, a tamping element carried by said structure, means for reciprocating said element, a smoothing device, a drive shaft, means operated by said shaft for elevating said structure, means operated by said movement of the structure for uncoupling the shaft from the means for reciprocating the tamping element, and means operating in timed relation with the movable structure for swingnig the smoothing element over the mold while the structure is raised.

11. In a cement block machine the combination with a mold, a series of tamping elements, means for reciprocating said elements, and means for raising and lowering said series relative to the mold, of a smoothing element and means operating in timed relation with the series of tamping elements for moving the smoothing element over the mold while said series is raised from the mold.

12. In a cement block machine the combination with a mold and a series of tamping elements movable bodily toward and from the mold, of a revoluble smoothing element, a drive shaft, separate means operated by the drive shaft for raising the series of tamping elements and continuously rotating the smoothing element, and means operated by said shaft and in timed relation to the series of tamping elements for shifting the rotating smoothing element across the mold and under the tamping element.

In testimony that I claim the foregoing as my own, I have hereto affixed my signature in the presence of two witnesses.

JAMES H. PEARSON.

Witnesses:
 ARRIE FREELAND,
 MARIE RIDDLE.